Dec. 8, 1936.   H. A. ROE   2,063,698
SCRAPER BUCKET APPARATUS
Filed March 2, 1934   10 Sheets-Sheet 2

Dec. 8, 1936. H. A. ROE 2,063,698
SCRAPER BUCKET APPARATUS
Filed March 2, 1934 10 Sheets-Sheet 9

Inventor:
Harry A. Roe,
By Dyrenforth, Lee, Chritton & Wiles,
Attys

Patented Dec. 8, 1936

2,063,698

UNITED STATES PATENT OFFICE 2,063,698

SCRAPER BUCKET APPARATUS

Harry A. Roe, Gardner, Ill., assignor to Sauerman Bros., Inc., Chicago, Ill., a corporation of Illinois Application March 2, 1934, Serial No. 713,750

28 Claims. (Cl. 37—129)

My invention relates generally to scraper apparatus operated by draft vehicles such as, and more particularly, tractors and used more especially in excavating, and/or for handling earth and involving mechanism by which the operator controls any one or more of the operations of loading the scraper, carrying the load and dumping the load; but as to certain features thereof to drag scrapers or dragline scrapers of the type, such as for example that disclosed in United States Letters Patent No. 1,481,273, granted January 22, 1924, wherein, by virtue of the shape of the scraper, the scraper digs when drawn forward and continues to dig until completely loaded, whereupon, by reason of the reaction of the material in the scraper against the sides of the scraper, it automatically ceases to dig and rides its load to the dumping point.

One phase of my invention and applicable to scrapers of the general kind above referred to, relates to the mechanism by which the operator controls the position of the scraper, it being one of my objects in this connection to provide mechanism whereby the effective point of draft on the scraper may be varied in a direction crosswise of the line of draft to control the digging action of the scraper and/or effect the dumping of the load.

Another object is to provide in connection with a drag scraper of such construction that upon digging a load it automatically, by reason of its shape, rides its load, mechanism which while permitting of the control of the position of the scraper by the operator, may be conditioned to permit the scraper to freely move, or float, in operating, in the same unrestricted manner as it would when drawn by a cable or the like as in the case of cable-operated drag scrapers.

Another phase of the invention relates to scrapers of such construction that the cutting action thereof may be varied, by forcing the rear end of the scraper downwardly, my object in this connection being to provide means for applying such a force to the scraper, preferably variable under the control of the operator, this feature being of special value in the case of scrapers, the cutting blades of which, at least as to those portions adjacent the median line of the scraper, extend otherwise than straight across the scraper to produce a progressively narrowing cutting effect in the forcing of the rear end of the scraper downwardly, as for examples, in the case of the scraper shown in said patent wherein the cutting blade in plan describes a substantially continuous curve, or as in the case of the general V-type of bottomless scraper wherein the cutting edges diverge forwardly, as thereby the digging effort may be concentrated at a relatively narrow portion of the cutting edge adjacent the median line of the scraper, thus permitting a given scraper, operated by a given tractor, to penetrate and dig in much harder materials than would be possible with other known scrapers of equal size.

Other objects of the invention will be apparent from the following description.

Referring to the accompanying drawings:

Figure 3 is a view in side elevation and partly diagrammatic of the hydraulically-operated means forming a part of the equipment shown in Figs. 1 and 2 for controlling the movements of the scraper.

Figure 4 is an enlarged fragmentary sectional view of the valve mechanism of the hydraulically operated means above referred to.

Figure 5 is a section taken at the irregular line 5—5 on Fig. 4 and viewed in the direction of the arrows.

Figure 6 is a fragmentary elevational view, partly sectional, showing a pump forming an element of the hydraulically operated means and its connection with the engine shaft of the tractor.

Referring to the construction shown in Figs. 1–6, inclusive, 30 represents a tractor of any suitable construction, such as for example as commonly provided, the tractor being provided at its rear end with a seat 31 for the operator and with a bar 32 terminating in a clevis 33 adapted for pivotal connection with the forward end of draft means represented generally at 34 by means of which the scraper represented at 35 is operated.

Figure 1:
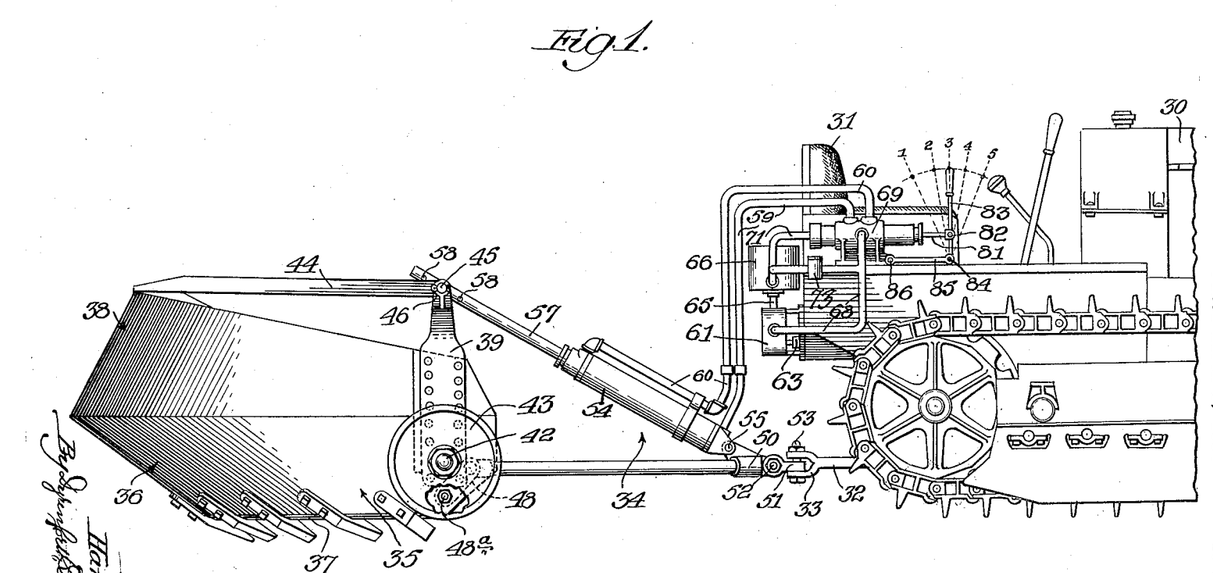
Figure 1 is a view in side elevation of tractor-drawn drag-scraper equipment constituting one embodiment of my invention, the front portion of the tractor being omitted.
Figure 2:
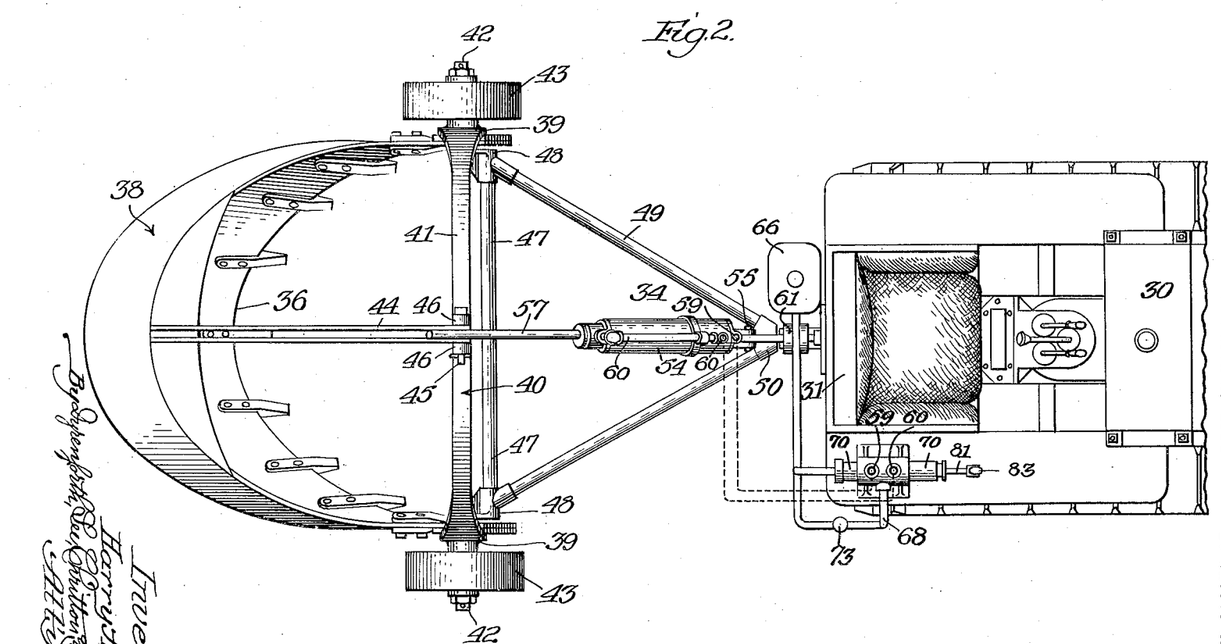
Figure 2 is a plan view of the structure shown in Fig. 1.

The particular type of scraper shown in these figures is that disclosed in said Letters Patent, presenting a body portion, which is curved in plan at any horizontal cross section therethrough, the lower portion of said body, represented at 36, presenting the curved cutting edge 37 sloping forwardly and downwardly from the rear portion of the scraper toward its forward ends at progressively steeper angles, and shown as provided with teeth which, however, may be omitted if desired, whereby the cutting edge has a substantially plowshare action causing the scraper to have a strong tendency toward digging in its travel against the material.

The upper portion 38 of the scraper and which is shown as of curved shape in plan, inclines upwardly and inwardly, the portion 38 not only serving to confine the material entering the scraper, but also as a surface against which the material may react to cause the scraper to stop digging, it being understood that the scraper has an inherent balance between a tendency to dig into the material when empty and an opposite tendency to run out of the material when filled to a certain position.

The front ends of the scraper are shown as rigidly connected with the depending arms 39 of a yoke 40, the cross bar 41 of which extends above the scraper, the lower ends of the yoke 39 being provided with stub shafts 42 on which wheels 43, supporting the scraper at its forward end at least during certain positions of the scraper, are journalled. A strut 44 connected at its rear end with the body of the scraper and at its forward end with a pin 45 extending through ears 46 on the cross bar 41, serves as a brace for stiffening the scraper structure.

The draft means for the scraper are shown as comprising a lower frame formed of a bar 47 secured at its ends in heads 48 pivotally connected with the forward ends of the scraper 35, as indicated of the one head at 48ª, and forwardly converging bars 49 connected at their rear ends with the heads 48 and at their forward ends to a head 50 carrying a link 51 pivoted thereto by a horizontal pin 52 and containing an opening to receive a draft pin 53 carried by the clevis 33.

The draft means also comprise fluid-pressure-operated means, shown as of the hydraulic type, for controlling the digging, load-carrying, and dumping positions of the scraper. The means shown for this purpose comprise a cylinder 54 pivoted to the head 50 by a horizontal pivot pin 55, and a piston 56 slidable in the cylinder 54 and having a stem 57 connected at its rear end with the pin 45, the stem 57 preferably containing a plurality of openings 58 therethrough to selectively receive the pin 45.

The ends of the cylinder 54 are connected with pipes 59 and 60 through which operating fluid is introduced into, or allowed to exhaust from, the opposite ends of the cylinder under the control of the operator as hereinafter fully explained.

Figures 3, 4, 5, 6:
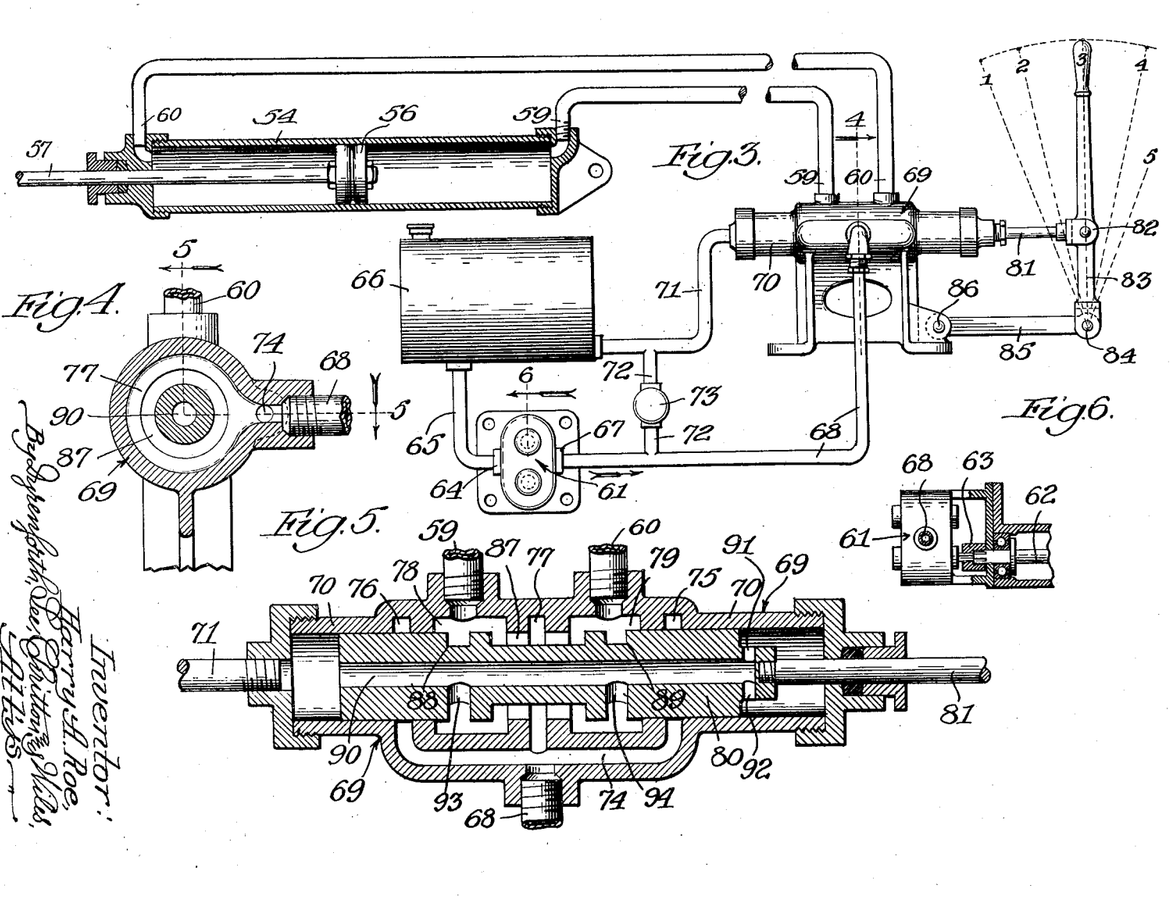

The fluid pressure mechanism also comprises a pump 61 carried by the tractor and shown as connected to the engine shaft 62 of the tractor, by a coupling device represented at 63. The pump 61, of any suitable construction for producing the desired flow of actuating liquid, is connected at its inlet end 64 with a pipe 65 which opens into a tank 66 carried by the tractor. The outlet end 67 of the pump opens into a pipe 68 which leads to a control valve represented generally at 69 and to which the pipes 59 and 60 lead.

The valve device 69, likewise mounted on the tractor, comprises a stationary cylindrical casing 70 into which the pipes 59, 60 and 68 open, the casing 70 at one end opening into a pipe 71 which is connected with the tank 66. A by-pass 72 connects together the pipes 68 and 71 at the outlet side of the pump and contains a pressure relief valve 73 opening toward the pipe 71 and provided to prevent excessive pressure in pipe 68 and which might otherwise occur as the pump 61 is a constant delivery pump.

The valve casing 70 contains a port 74 opening at its ends into annular grooves 75 and 76, respectively, in the inner surface of the valve casing, the port 74 communicating between its ends with an annular groove 77 in the inner surface of the casing. The inner surface of the valve casing 70 between the grooves 76 and 77 and between the grooves 75 and 77 is grooved as represented at 78 and 79, respectively, the pipe 59 opening into the groove 78 and the pipe 60 into the groove 79.

The valve device 69 also comprises a valve 80, shown as in the form of a piston, which is slidable in the cylinder 70 and has a stem 81 pivotally connected at its outer end, as indicated at 82, to a lever 83 the lower end of which is pivoted at 84 to a link 85, in turn, pivoted at 86 to the valve casing 70.

The valve 80 contains midway between its ends an annular relatively wide peripheral groove 87 and at opposite sides of this groove, relatively narrow grooves 88 and 89. The valve 80 contains a longitudinally extending bore 90 constantly open at one end to the pipe 71 and at its other end to the opposite end of the cylinder through ports 91 and 92 in the valve. The grooves 88 and 89 communicate at all times with the bore 90, through passages 93 and 94, respectively.

Referring now to the control of the piston 56 by the valve device 69, it may be stated that the valve 80 is adapted to be moved into five different operating positions (Fig. 3). When the lever 83 is shifted into the No. 1 position the groove 88 in the valve 80 will register with the groove 76, which opens the pipe 68 to the groove 88, and therefore the pump 61 to the pipe 71 leading to the tank 66, the pipes 59 and 60 becoming closed to each other and also to the pipes 68 and 71 thereby locking the piston 56 against movement in either direction in the cylinder 54.

When the lever 83 is moved to No. 2 position the pipe 68 becomes closed to the pipe 71, but open to the pipe 59 through the grooves 87 and 78, pipe 60 being closed to pipe 68, but open to pipe 71 through the grooves 79 and 89, passages 94 and bore 90.

In this position of the valve 80 operating fluid enters the cylinder 54 through the pipe 59 for forcing the piston 56 to the left in Fig. 3, the liquid ahead of the piston escaping through the pipe 60 and valve device 69 to pipe 71.

When the lever 83 is moved to No. 3 position (Fig. 5) all of the pipes 59, 60, 68 and 71 are open to each other thereby permitting the piston 56 to freely move in the cylinder 54 in either direction.

When the lever 83 is shifted to No. 4 position, the pipe 68 is opened to the pipe 60 through the grooves 87 and 79 and the pipe 59 is opened through the grooves 78 and 88, passage 93 and bore 90 to the pipe 71. Thus the actuating fluid enters the cylinder 54 through the pipe 60 for driving the piston 56 to the right in Fig. 3, the fluid ahead of the piston exhausting through the pipe 59 and valve device 69 to pipe 71 to the tank.

When the lever 83 is moved to position No. 5 59 and 60 become closed to each other and to the pipes 68 and 71 and the pipe 68 becomes opened to the pipe 71 thereby locking the piston 56 against movement in either direction and permitting the pump to operate without obstruction.

The piston 56 being connected, by means of the piston rod 57, with the scraper at the top thereof above the wheels, it will be apparent that by setting the lever 83 in position No. 3, the hydraulic mechanism will have no effect on the scraper and it will be free to move or float in the same manner as it would were the fluid pressure mechanism omitted, the scraper thus performing exactly as it does when used with dragline apparatus.

When the lever 83 is moved to position No. 2 the fluid pressure mechanism exerts a rearward force against the upper part of the forward end of the scraper thus forcing the scraper at its cutting edge portion downwardly which causes the front of the scraper to rise depending upon the position to which the piston 56 is forced in the cylinder 54. The longer this movement of the piston, the greater the inclination of the scraper and therefore the less length of cutting edge presented to the material, or the fewer of the teeth portions of the cutting edge when employed, this feature resulting in the concentration of the digging effort of the scraper upon a relatively narrow portion or point of the cutting edge which is highly useful particularly when digging relatively hard materials.

As soon as the piston 56 has been moved to the desired position, namely, to rearwardly tilt the scraper to the desired extent, the operator throws the lever 83 to position No. 1, whereupon the piston 56 becomes locked in the set position, the pump 61, however, continuing in operation without obstruction as the pipe 68, in this position of the valve is connected with the pipe 71 and thus a closed circuit through which the liquid may be circulated is afforded.

When the lever 83 is shifted to No. 4 position, the fluid pressure mechanism exerts a force on the front end of the scraper, through the piston 56, for rotating the scraper upwardly and forwardly on the wheels 43, to effect either the degree of digging and/or the discharge of the material from the scraper either gradually or quickly, depending upon the degree to which the scraper is tilted. The scraper is held in the desired tilted position by the operator throwing the lever 83 from No. 4 position to No. 5 position which locks the piston 56 against movement in the cylinder.

Assuming the scraper to have been dumped the scraper is returned to digging position by the operator throwing the lever 83 to No. 3 position thus permitting the scraper to drop back by gravity, to digging position, or to No. 2 position for forcing the scraper to digging position under the control of the fluid pressure mechanism.

Manifestly the fluid pressure piston and cylinder mechanism and the rigid bar 34 could be interchanged, viz., the fluid pressure mechanism could form the lower couple of the draft mechanism and the rigid bar 34 the upper couple thereof, without altering the functioning of the draft means.

Referring to the construction shown in Figs. 7 to 10, inclusive, the body portion 95 of the scraper shown therein and represented at 96, is of the same form as that shown in the preceding figures, the forward ends of the body portion 95 being rigidly connected together by an upwardly extending yoke 97 and being equipped at their forward extremities with curved shoes 98 at which the scraper rolls in the turning of the scraper to and from dumping position.

The draft means for the scraper comprise an upper bar section 99 pivotally connected at its rear end with the yoke 97 by means of a pin 100 engaging a strut 101 and corresponding with the strut 44 of Figs. 1–6. The forward end of the bar 99 connects with a head 102 swiveled on a pin 103 which is pivotally connected at 104 with a link 105 corresponding with the link 51 of Figs. 1–6 and which would connect with bar 32 of the tractor.

Figures 9, 10:
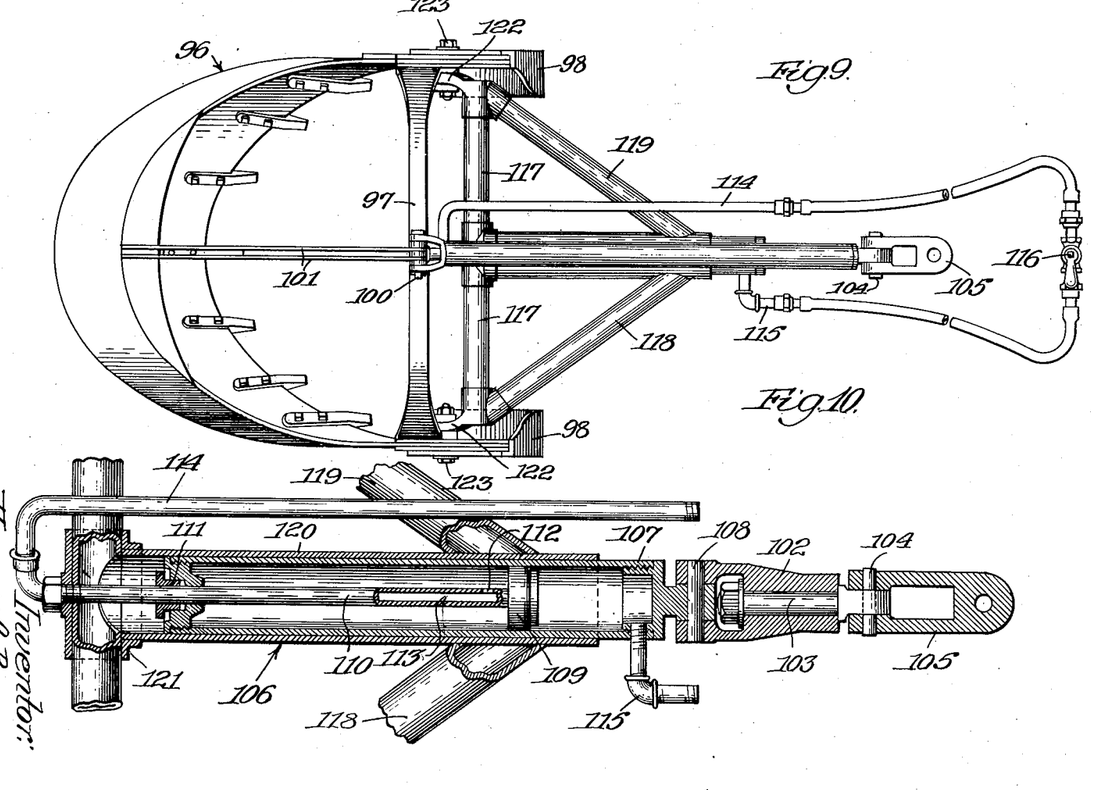
Figure 9 is a plan view of the scraper equipment shown in Figs. 7 and 8.
Figure 10 is an enlarged plan, partly sectional, view of the draft means of the structure shown in Figs. 7, 8 and 9.

The draft means also comprise a lower fluid pressure controlled section represented generally at 106 and comprising a cylinder 107 pivoted at a horizontal pin 108 to the rearward end of the head 102. The cylinder 107 contains a piston 109 slidable therein and mounted on a tubular stem 110 slidable in a stuffing box 111 in one end of the cylinder 107, the stem 110 containing a port 112 communicating with the interior of the cylinder 107 at one side of the piston 109 and with the passage 113 extending through the stem.

The stem 110 at its outer end opens into a pipe 114 which is thus in communication, through the stem 110 and the port 112, with the cylinder 107 at one side of the piston 109, the cylinder 107 at the opposite side of the piston opening into a pipe 115. The pipes 114 and 115 are connected by a valve device 116 of any suitable construction for opening and closing communication between the tractor preferably in a position convenient pipes 114 and 115, the valve 116 being located on for ready manipulation by the operator stationed on the tractor.

The draft section 106 also comprises a frame shown as of triangular shape and formed of a cross member 117, forwardly converging side members 118 and 119, and a tubular cylinder-forming portion 120 connected at one end with the cross member 117 at a fitting 121 and toward its opposite, forward, end with the forward ends of the side members 118 and 119. The frame thus provided is pivotally connected, at rearwardly extending lugs 122, with the front ends of the scraper by means of pivots represented at 123, the cylinder portion 120 being telescoped with the stationary cylinder 107 along which latter the frame referred to is slidable. The rear end of the piston stem 110 is rigidly connected with the frame at the fitting 121 whereby the frame moves responsive to the movements of the piston in the cylinder 107.

As will be understood from the foregoing description, the piston 109 is restrained against movement in the cylinder 107 when the valve 116 is closed but is free to move therein when this valve is opened.

Figure 7:
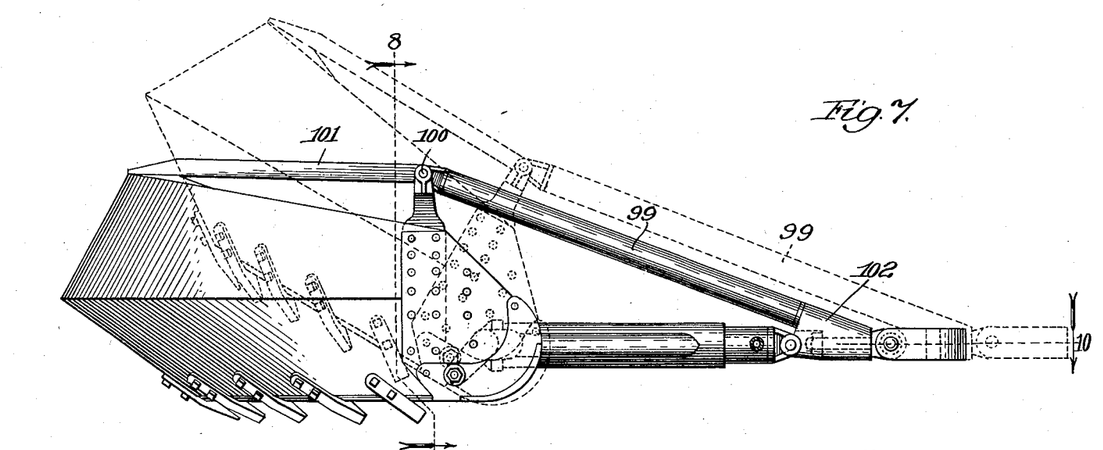
Figure 7 is a view in side elevation of another form of drag-scraper equipment embodying my invention, the tractor being omitted, the scraper being shown by full lines in operating position and by dotted lines in dumping position.
Figure 8:
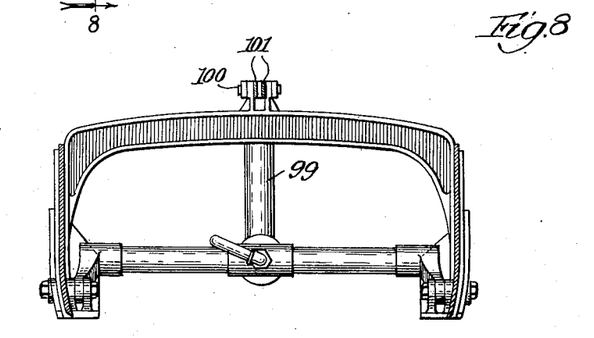
Figure 8 is a section taken at the irregular line 8—8 on Fig. 7 and viewed in the direction of the arrows.

Assuming the scraper to be in the digging position shown by the full lines in Fig. 7, the operator to permit the scraper to dig and load, closes the valve 116 which is continued in closed position until the load is to be dumped, whereupon the operator opens the valve 116 thus freeing the piston 109 for movement in the cylinder 107 which results in the concentrating of the draft force against the scraper at the connection between the bar 99 and the upper end of the scraper, thus causing the scraper to turn upwardly at its rear end on the shoes 98 to the dotted position shown in Fig. 7 for dumping the load, it being understood that the scraper may be stopped in its turning movement at any intermediate position by closing the valve 116 to regulate the speed at which the load is dumped, or to hold the bucket in a load-carrying position intermediate between digging and dumping positions.

The scraper is returned to digging position by backing up the tractor. In this operation the valve 116 would be open and the scraper would roll back on its curved shoes to the digging position shown by the full lines in Fig. 7, whereupon the valve 116 would again be closed to hold the scraper in position for digging another load.

Figure 11:
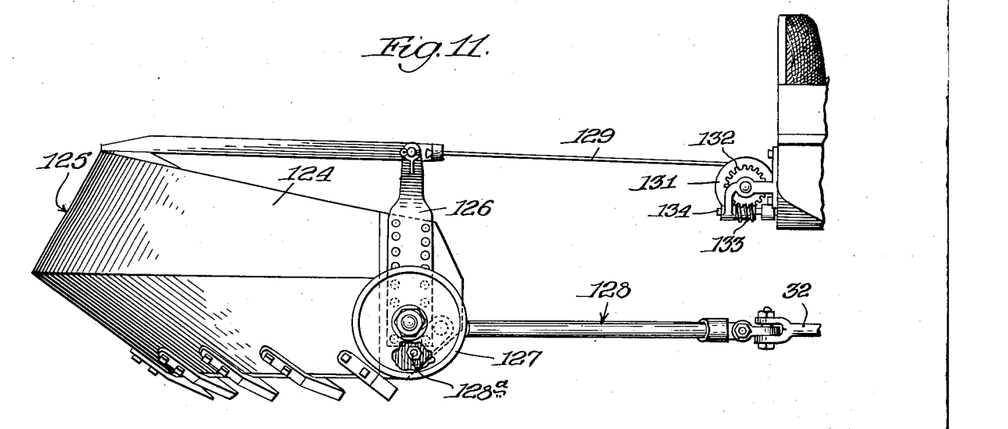
Figure 11 is a view in side elevation of another construction of tractor-drawn drag-scraper equipment constituting another embodiment of my invention, the rear portion only of the tractor being shown.
Figure 12:
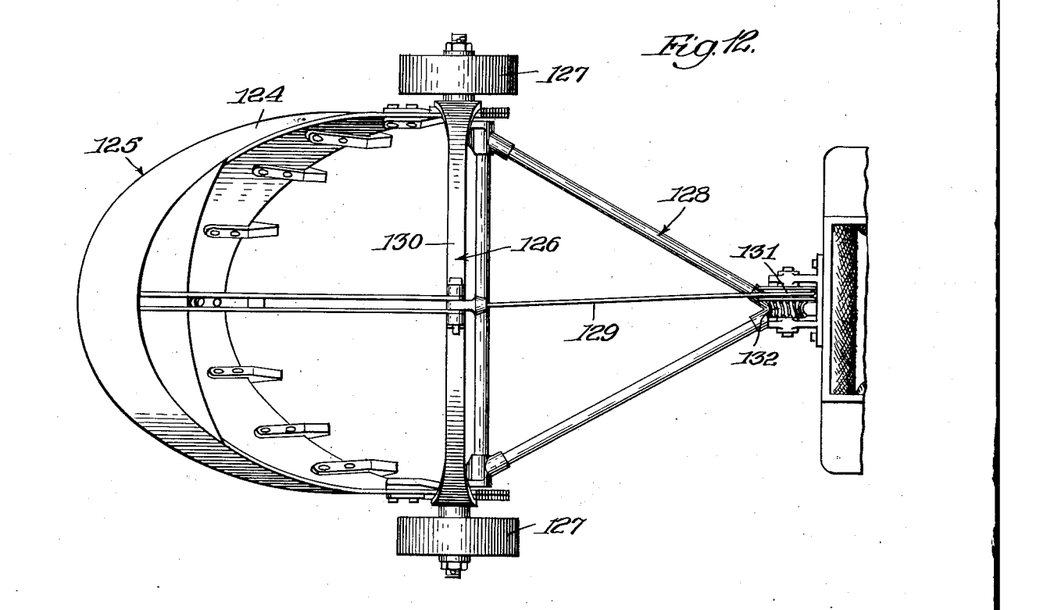
Figure 12 is a plan view of the construction in Fig. 11.

Referring to the construction shown in Figs. 11 and 12, the body portion 124 of the scraper shown therein and represented at 125, is of the same form as that shown in Figs. 1-6, inclusive, the forward ends being rigidly connected together by a yoke 126 and having wheels 127 as shown and described of the construction shown in Figs. 1 to 6.

The draft means for the scraper 125 comprises a lower frame section 128, like the lower frame section 34 of Figs. 1-6, inclusive, pivotally connected at its forward end to the draft bar 32 of the tractor, as in the case of the construction of these figures, and pivotally connected at its rear end with the front ends of the scraper at studs thereon one of which is represented at 128ᵃ.

The draft means also comprise an upper section shown as in the form of a cable 129 connected at its rear end with the upper cross bar 130 of the yoke 126, the forward end of the cable 129 being wound upon a drum 131 journalled on the tractor and shown as operated through the medium of gears 132 and 133 connected, respectively, with the drum and with an operating shaft 134 which, by way of example may be controllably driven (in a manner not shown) from any suitable source of power, as for example the engine of the tractor.

As will be understood, the draft force for digging is exerted on the scraper 125 through the draft section 128, the cable 129 being maintained in sufficiently slack condition as not to interfere with the floating action of the scraper in digging when such action is desired, or drawn upon to tilt the rear end of the scraper upwardly to vary the degree of digging. The load is dumped by winding the cable 129 on the drum 132 thus turning the scraper at its rear end upwardly on the wheels 127 to the desired position of dumping, the scraper being returned to digging position by slackening the cable 129.

Figure 13:
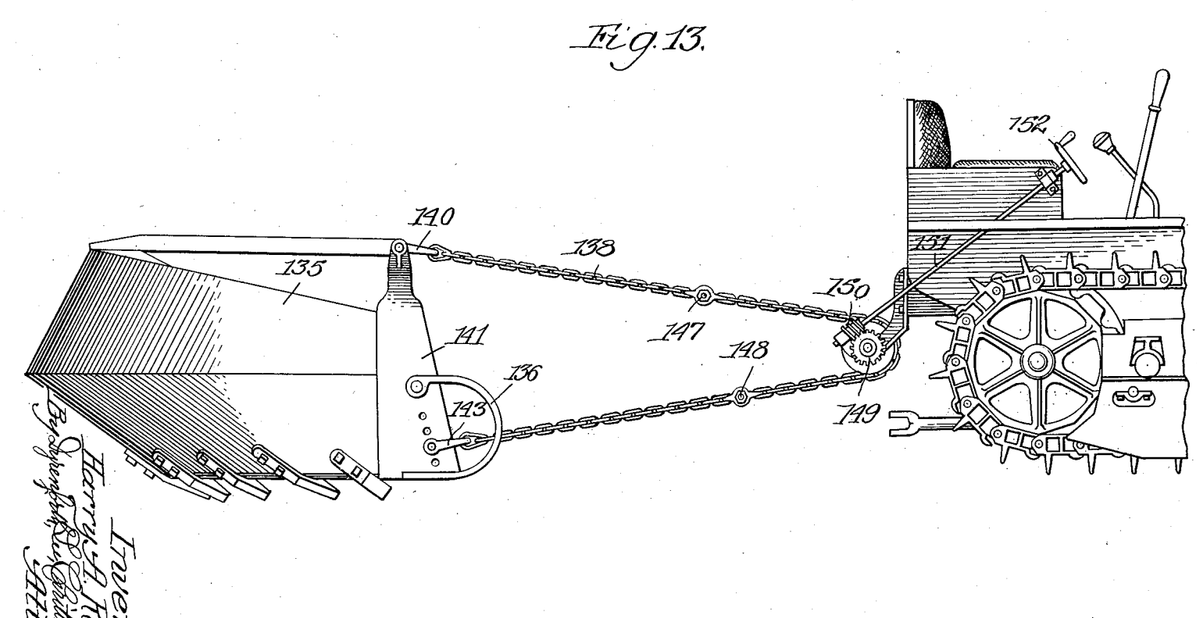
Figure 13 is a view in side elevation of still another construction of tractor-drawn drag-scraper equipment embodying my invention, the rear end only of the tractor being shown.
Figure 14:
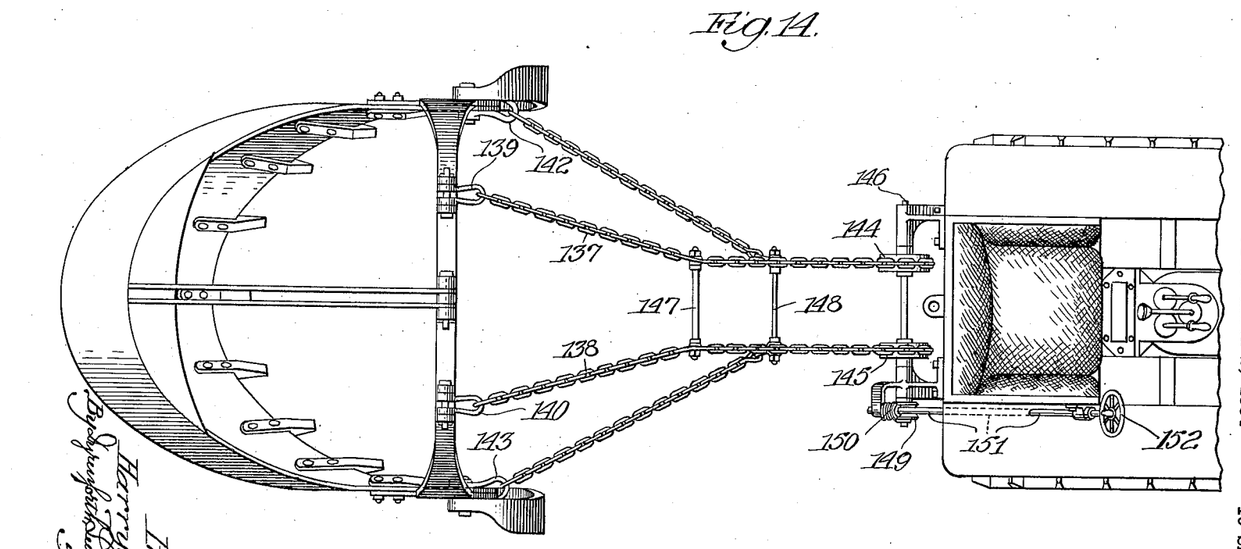
Figure 14 is a plan view of the construction shown in Fig. 13.

Referring to Figs. 13 and 14, the scraper shown therein and represented at 135 is of the same construction as that shown in Figs. 1-6, inclusive, except for the substitution of shoes 136 for the wheels 43.

In this construction the draft means for the scraper are shown as in the form of chains 137 and 138, these chains being connected at their rear upper ends with clevises 139 and 140, respectively, shown as pivoted on the upper cross bar of the yoke 141 of the scraper and at their lower rear ends to clevises 142 and 143, respectively, pivoted to the forward ends of the scraper.

The chains 137 and 138 extend at their intermediate portions over sheaves 144 and 145 secured to a shaft 146 journalled on the rear end of the tractor, the upper and lower reaches of the chains 137 and 138 being connected together, respectively, by cross bars 147 and 148.

The shaft 146 is shown as equipped with a worm wheel 149 meshing with a worm 150 carried by a shaft 151 journalled on the tractor and having a hand wheel 152 for actuating it.

As will be understood, the cable draft means described may be manipulated to a position in which the scraper is free to function in digging without any restraint from the upper reaches of the chains, or to a position for varying the digging action, but when it is desired to dump the load the operator, by actuating the drive mechanism for the sheaves 144 and 145 to draw on the upper reaches of the chain and pay out the lower reaches thereof, may turn the scraper 135 upwardly at its rear end to dumping position in which operation the scraper turns on the shoes 136. The scraper may be restored to digging position by reversing the sheave-actuating mechanism to permit the scraper to turn downwardly to digging position.

Figures 15, 16, 17:
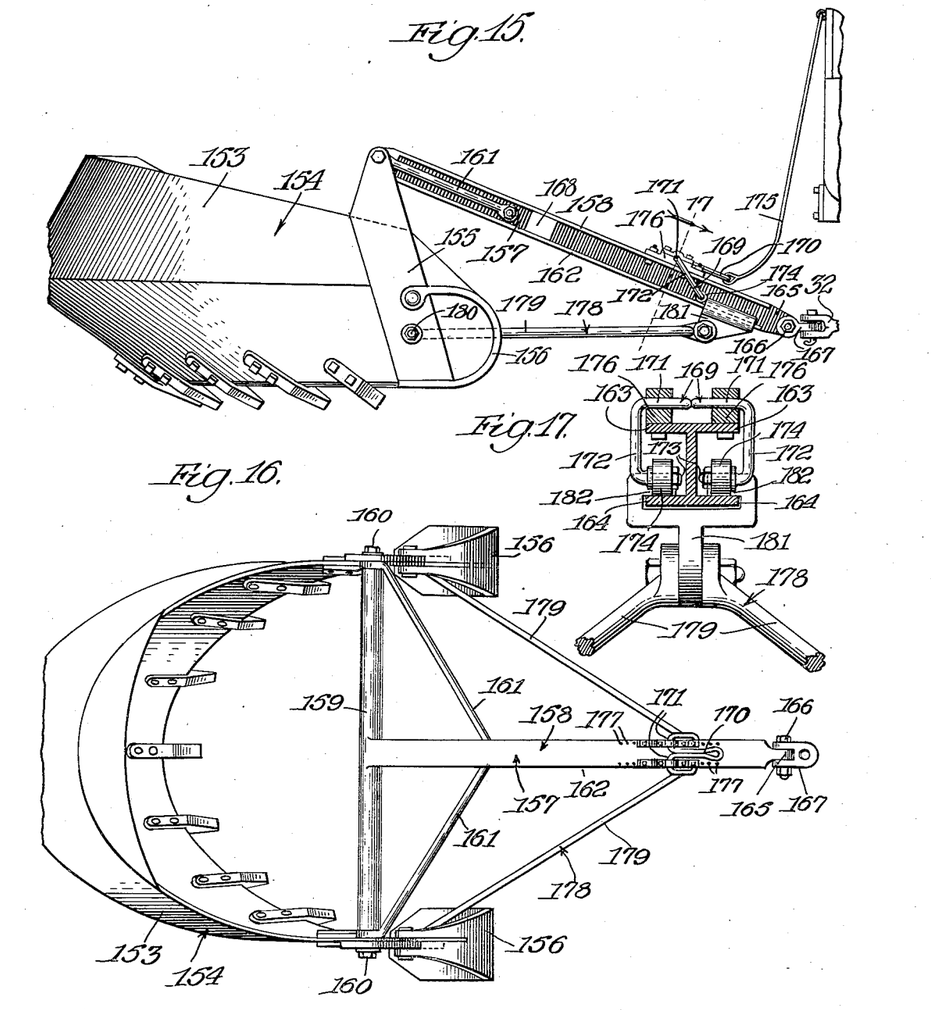
Figure 15 is a view in side elevation of still another construction of tractor-drawn drag-scraper equipment embodying my invention, the rear end only of the tractor being shown.
Figure 16 is a plan view of the construction shown in Fig. 15, the tractor being omitted.
Figure 17 is an enlarged sectional view taken at the line 17 on Fig. 15 and viewed in the direction of the arrow.

Referring to Figs. 15 and 16, the body portion 153 of the scraper shown therein and represented at 154, is of the same form as that shown in Figs. 1-6, inclusive, the forward ends thereof being connected with plates 155 equipped at their lower portions with curved shoes 156. The draft means for the scraper comprises an upper draft section in the form of a frame 157 comprising a T-shaped member 158, the rear cross bar portion 159 of which is positioned between the upper ends of the plates 155 on which this frame is pivoted at its end portions which extend through the plates 155 and have units 160 screwed thereon.

The frame 157 also comprises forwardly converging brace bars 161 through the rear deflected ends of which the journalling ends of the cross bar 159 extend, these bars being rigidly connected with the straight bar portion 162 of the frame 158 which is of H-shape in cross section affording the upper and lower flanges 163 and 164, the forward end of the bar portion 162 terminating in an ear 165 pivoted at 166 to one end of a link 167 the opposite end of which is pivotally connected with the draft bar 32 of the tractor.

The bar portion 162 is provided between its ends with stationary stop blocks one of which is shown at 168, secured in the channels of this bar, and forward of the stops 168 with a pivoted dog 169. The dog 169 is shown as formed of a rod bent to provide a central portion 170, horizontal journalling portions 171 and depending portions 172 having inturned ends 173 provided with rollers 174 which extend into the channels of the bar 162, the depending portions 172 extending forwardly at an acute angle to the portion 170 which latter extends along the upper surface of the bar 162 and is connected at its forward end with an actuating cable 175 shown as hung over the rear end of the tractor.

The dog 169 is journalled at its portions 171 in journal boxes 176 secured to the bar 162 which latter is shown as containing a double series of openings 177 therethrough to permit of the securing of the boxes at different positions along the bar 162.

The draft means also comprise a lower section 178 shown as formed of a pair of forwardly converging bars 179 pivotally connected at their rear ends with the plates 155, as represented at 180, and at their forward ends with a block 181. The block 181 is so shaped as to straddle both flanges 164 of the bar 162, the upper portions of the block and represented at 182 extending into a position to engage the rollers 174 in the normal position of the dog 169, as shown.

To perform the digging and load carrying operations the parts would be in the positions as shown in the drawings, in which position the dog 169 engages the rear faces of the portions 182 of the block 181, thus causing the draft force exerted by the tractor to be applied to the scraper through the bar 162 to the dog 169, thence to the block 181 and through the lower draft section 178 to the scraper.

To dump the load the operator swings the dog 169 upwardly out of engagement with the block 181 whereupon the draft force is transferred from the lower portion of the scraper through the lower draft section 178, to the upper portion of the scraper through the upper draft section 157.

Upon restoring the scraper to digging position, after dumping the load, by backing up the tractor, the dog 169 will fall into place behind the block 181 to recondition the scraper equipment for digging another load.

Figures 18, 19, 20:
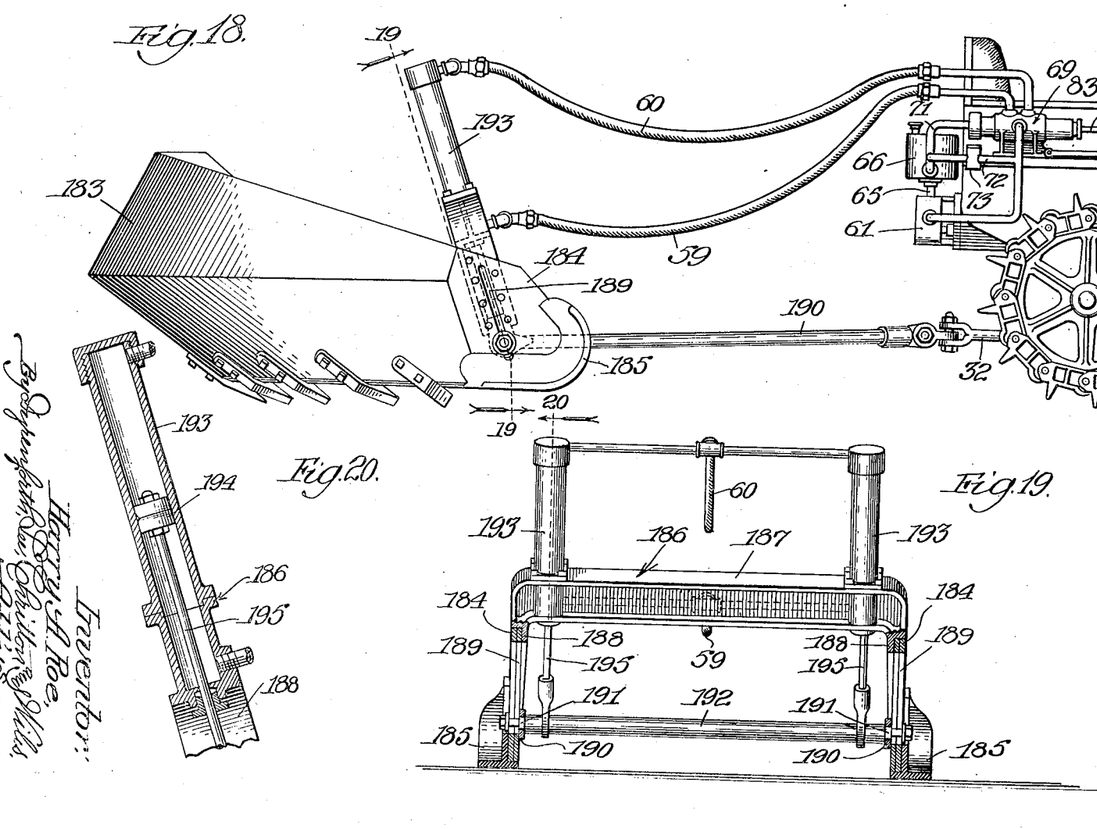
Figure 18 is a view in side elevation of still another construction of tractor-drawn drag-scraper equipment embodying my invention, the rear end only of the tractor being shown.
Figure 19 is a section taken at the irregular line 19—19 on Fig. 18 and viewed in the direction of the arrows.
Figure 20, a fragmentary enlarged sectional view taken at the line 20 on Fig. 19 and viewed in the direction of the arrow.

Referring to Figs. 18, 19 and 20, the body portion of the scraper shown therein and represented at 183 is of the same form as that shown in Figs. 1–6, inclusive, the forward ends of the body portion having side plates 184 and curved shoes 185 and being connected together by a yoke 186 the cross piece 187 of which, shown as of H-shape in cross section, extends across the top of the body portion 183. The depending arms 188 of the yoke 186 extend at the inner surfaces of the body portion 183 and, together with the forward ends of the body portion and plates 184, are slotted as indicated at 189.

The draft means for the scraper comprise a pair of forwardly converging bars 190 connected at their forward ends to the draft bar 32 of the tractor as in the construction shown in Figs. 1–6, inclusive, and at their rear eye-equipped ends pivotally to the stepped reduced ends 191 of a cross bar 192 at which this bar extends into, and is adjustable up and down in, the slots 189, to vary the elevation at which the draft is exerted on the scraper.

Cooperating with the cross bar 192 are means, shown as of the fluid pressure operated type, for effecting the adjustment of the cross bar 192 in the slots 189, operative, during the travel of the tractor, for controlling the digging, load carrying, and dumping positions of the scraper these means comprising a pair of upwardly extending spaced apart cylinders 193 stationarily mounted on the cross member 187 of the yoke 186, and pistons, one only of which is shown at 194, slidable in these cylinders and connected at their stems 195 with the cross bar 192.

Means are provided for selectively introducing operating fluid, preferably liquid, under pressure into the ends of the cylinders 193 and exhausting it therefrom to either force the pistons 194 up or down and lock them in their positions of adjustment. The particular means shown for this purpose are of the same construction as those shown in Figs. 1 to 6, inclusive, for controlling the actuation of the piston 56 though, as will be understood, the above referred to No. 3 position of the valve mechanism is functionless in this particular scraper-tractor arrangement. Accordingly, the same numerals are applied to the parts of the piston-controlling mechanism in Fig. 18 as are applied to the corresponding parts in Figs. 3 and 5.

From the foregoing description it will be understood that when the lever 83 is shifted to No. 2 position the pistons 194, together with the cross bar 192, will be raised in the slots 189, the liquid above the pistons 194 exhausting back to the tank 66, and by then shifting the lever 83 to No. 1 position the pistons 194, together with the cross bar 192, will be locked against movement; and that by shifting the lever 83 to No. 4 position the pistons 194, together with the cross rod 192, will be lowered in the slots 189, the liquid below the pistons exhausting back to the tank 66, these pistons together with the cross bar, being locked in their position of adjustment by shifting the lever 83 to the No. 5 position.

The slots 189 are so located that in the lowered position of the cross bar 192 the draft on the scraper will permit it to function to dig and thereafter ride its load as freely as in equipment involving a scraper of the form shown and operated by a drag line as commonly provided; that when the cross bar is moved upwardly in the slots 198 the degree of digging may be varied, and that when the cross bar is moved to the upper portions of these slots as described, the scraper will be tilted on the shoes 185 upwardly at its rear end to dump the load. The scraper is returned to digging position by gravity upon manipulating the valve mechanism to effect the lowering of the cross bar 192 in the slots 189.

It will be seen that in all forms, the bucket has arcuate dig preventing members, either skids or wheels, at the forward extremities of the cutting edge and also has means to hold the bucket in adjusted position between digging or freely floating and dumping positions. It is therefore obvious that by tilting the rear portion of the bucket upwardly out of digging position but not enough to dump the load, the bucket may be held and drawn along in a position in which the weight of the bucket and a portion of the weight of the load will be carried on said arcuate members as on a fulcrum.

While I have illustrated and described certain forms of embodiment of my invention and as associated with a scraper of a particular form, I do not wish to be understood as intending to limit it thereto as the invention may be embodied in other forms and utilized with scrapers of other shapes and constructions.

What I claim as new, and desire to secure by Letters Patent, is:

1. In combination, a draft vehicle, a bottomless scraper bucket of a form adapting the bucket to dig, and also to stop digging, by the same draft force coupled with the reactive force due to resistance of the material into which the bucket is drawn, means connecting said bucket with the vehicle pivoted to said bucket upon a horizontal axis closely adjacent the ground and to the front end of the bucket, and means to turn the bucket about a horizontal axis passing through a ground-engaging portion of the bucket.

2. In combination, a draft vehicle, a bottomless scraper bucket of a form adapting the bucket to dig, and also to stop digging, by the same draft force coupled with the reactive force due to resistance of the material into which the bucket is drawn, means connecting said bucket with the vehicle pivotally connected to the bucket on a horizontal axis closely adjacent the ground and the front end of the bucket and permitting said bucket to be turned on the ground in a vertical plane about an axis passing through a ground-engaging portion of the bucket, and means for varying the couple between the draft force and said reactive force, for the purpose set forth.

3. In combination, a draft vehicle, a scraper bucket supported solely by the ground, having a lower cutting edge so shaped that in the turning of the bucket downwardly at its rear portion a progressively narrowing cutting effect is produced, draft means connecting the bucket with the vehicle permitting said bucket to be turned on the ground in a vertical plane, and means operative to exert a force against the bucket for turning it downwardly at its rear portion relative to the draft means.

4. In combination, a draft vehicle, a scraper bucket supported solely by the ground, having a lower rearwardly curving cutting edge, draft means connecting the bucket with the vehicle permitting said bucket to be turned on the ground in a vertical plane, and means operative to exert a force against the bucket for turning it downwardly at its rear portion relative to the draft means.

5. In combination, a draft vehicle, a scraper bucket supported solely by the ground, having a lower cutting edge so shaped that in the turning of the bucket downwardly at its rear portion a progressively narrowing cutting effect is produced, draft means connecting the bucket with the vehicle permitting said bucket to be turned on the ground in a vertical plane, and means operative to exert a force against the bucket for either turning it downwardly at its rear portion or tilting it upwardly at its rear portion relative to the draft means.

6. In combination, a draft vehicle, a scraper bucket supported solely by the ground, having a lower cutting edge so shaped that in the turning of the bucket downwardly at its rear portion a progressively narrowing cutting effect is produced, draft means connecting the bucket with the vehicle permitting said bucket to be turned on the ground in a vertical plane, and means engaging the upper portion of said bucket operative to turn the bucket downwardly at its rear portion relative to the draft means.

7. In combination, a draft vehicle, a scraper bucket, draft means connecting said bucket with said vehicle and permitting said bucket to be turned on the ground in a vertical plane, said draft means comprising draft elements connected at different elevations to said bucket, one of said elements being formed of relatively lengthwise movable sections and means controlling the adjustment of said sections relative to each other and conditionable to free said sections for free relative lengthwise movement, for the purpose set forth.

8. In combination, a draft vehicle, a scraper bucket, draft means connecting said bucket with said vehicle and permitting said bucket to be turned on the ground in a vertical plane, said draft means comprising draft elements connected at different elevations to said bucket, the upper one of said elements being formed of relatively lengthwise movable sections and fluid pressure means controlling the adjustment of said sections relative to each other and conditionable to free said sections for free relative lengthwise movement, for the purpose set forth.

9. In combination, a draft vehicle, a scraper bucket, draft means connecting said bucket with said vehicle and permitting said bucket to be turned on the ground in a vertical plane, said draft means comprising draft elements connected at different elevations to said bucket, the upper one of said elements being formed of relatively lengthwise movable sections and hydraulic means controlling the adjustment of said sections relative to each other and conditionable to free said sections for free relative lengthwise movement, for the purpose set forth.

10. In combination, a draft vehicle, a scraper bucket, draft means connecting said bucket with said vehicle and permitting said bucket to be turned on the ground in a vertical plane, said draft means comprising draft elements connected at different elevations to said bucket, the upper one of said elements being formed of relatively lengthwise movable sections and means for adjusting said sections relative to each other and adapted to be conditioned for holding said sections in adjusted position and for permitting free relative movement of said sections.

11. In combination, a draft vehicle, a scraper bucket, draft means connecting said bucket with said vehicle and permitting said bucket to be turned on the ground in a vertical plane, said draft means comprising draft elements connected at different elevations to said bucket, the upper one of said elements being formed of relatively lengthwise movable sections and fluid pressure means for adjusting said sections relative to each other and adapted to be conditioned for holding said sections in adjusted position and for permitting free relative movement of said sections.

12. In combination, a draft vehicle, a scraper bucket, draft means connecting said bucket with said vehicle and permitting said bucket to be turned on the ground in a vertical plane, said draft means comprising draft elements connected at different elevations to said bucket, the upper one of said elements being formed of relatively lengthwise movable sections and hydraulic means for adjusting said sections relative to each other and adapted to be conditioned for holding said sections in adjusted position and for permitting free relative movement of said sections.

13. In combination, a draft vehicle, a scraper bucket having a lower cutting edge so shaped that in the turning of the bucket downwardly at its rear portion a progressively narrowing cutting effect is produced, draft means for the bucket permitting said bucket to be turned on the ground in a vertical plane, said draft means comprising draft elements connected at different elevations to said bucket, the upper one of said draft elements being formed of relatively lengthwise movable sections and means controlling the adjustment of said sections relative to each other and conditionable to permit free relative lengthwise movement of said sections, for the purpose set forth.

14. In combination, a draft vehicle, a scraper bucket having a lower cutting edge so shaped that in the turning of the bucket downwardly at its rear portion a progressively narrowing cutting effect is produced, draft means for the bucket permitting said bucket to be turned on the ground in a vertical plane, said draft means comprising draft elements connected at different elevations to said bucket, the upper one of said draft elements being formed of relatively lengthwise movable sections and fluid-pressure means controlling the adjustment of said sections relative to each other and conditionable to permit free relative lengthwise movement of said sections, for the purpose set forth.

15. In combination, a draft vehicle, a scraper bucket having a lower cutting edge so shaped that in the turning of the bucket downwardly at its rear portion a progressively narrowing cutting effect is produced, draft means for the bucket permitting said bucket to be turned on the ground in a vertical plane, said draft means comprising draft elements connected at different elevations to said bucket, the upper one of said draft elements being formed of relatively lengthwise movable sections and means for adjusting said sections relative to each other and adapted to be conditioned for holding said sections in adjusted position and for permitting free relative movement of said sections.

16. In combination, a draft vehicle, a scraper bucket having a lower cutting edge so shaped that in the turning of the bucket downwardly at its rear portion a progressively narrowing cutting effect is produced, draft means for the bucket permitting said bucket to be turned on the ground in a vertical plane, said draft means comprising draft elements connected at different elevations to said bucket, the upper one of said draft elements being formed of relatively lengthwise movable sections, and means operable to cause the upper one of said draft elements to exert force on said bucket either to depress the rear portion of said bucket or tilt the bucket forwardly at its rear portion and conditionable to free said sections for free relative lengthwise movement, for the purpose set forth.

17. In combination, a draft vehicle, a scraper bucket having a lower cutting edge so shaped that in the turning of the bucket downwardly at its rear portion a progressively narrowing cutting effect is produced, draft means for the bucket permitting said bucket to be turned on the ground in a vertical plane, said draft means comprising draft elements connected at different elevations to said bucket, the upper one of said draft elements being formed of relatively lengthwise movable sections, and means operable to cause the upper one of said draft elements to exert force on said bucket either to depress the rear portion of said bucket or tilt the bucket forwardly at its rear portion and conditionable for holding said sections in adjusted position and also to free said sections for free relative lengthwise movement.

18. In combination, a draft vehicle, a scraper bucket having a lower cutting edge so shaped that in the turning of the bucket downwardly at its rear portion a progressively narrowing cutting effect is produced, draft means for the bucket permitting said bucket to be turned on the ground in a vertical plane, said draft means comprising draft elements connected at different elevations to said bucket, the upper one of said draft elements being formed of relatively lengthwise movable sections, and fluid-pressure means operable to cause the upper one of said draft elements to exert force on said bucket either to depress the rear portion of said bucket or tilt the bucket forwardly at its rear portion and conditionable for holding said sections in adjusted position and also to free said sections for free relative lengthwise movement.

19. In combination, a draft vehicle, a scraper bucket having a lower cutting edge so shaped that in the turning of the bucket downwardly at its rear portion a progressively narrowing cutting effect is produced, draft means for the bucket permitting said bucket to be turned on the ground in a vertical plane said draft means comprising draft elements connected at different elevations to said bucket, the upper one of said draft elements being formed of relatively lengthwise movable sections, and fluid-pressure means operable to cause the upper one of said draft elements to exert force on said bucket either to depress the rear portion of said bucket or tilt the bucket forwardly at its rear portion and conditionable to free said sections for free relative lengthwise movement, for the purpose set forth.

20. In combination, a draft vehicle, a scraper bucket having a lower cutting edge so shaped that in the turning of the bucket downwardly at its rear portion a progressively narrowing cutting effect is produced, draft means for the bucket permitting said bucket to be turned on the ground in a vertical plane, said draft means comprising draft elements connected at different elevations to said bucket, the upper one of said draft elements being formed of relatively lengthwise movable sections, and hydraulic means operable to cause the upper one of said draft elements to exert force on said bucket either to depress the rear portion of said bucket or tilt the bucket forwardly at its rear portion and conditionable to free said sections for free relative lengthwise movement, for the purpose set forth.

21. In combination, a draft vehicle, a bottomless scraper bucket of a form adapting the bucket to dig, and also to stop digging, by the same draft force coupled with the reactive force due to resistance of the material into which the bucket is drawn, means connecting said bucket with the vehicle pivotally connected to the bucket on a horizontal axis closely adjacent the ground and the front end of the bucket and permitting said bucket to be turned on the ground in a vertical plane about an axis passing through a ground-engaging portion of the bucket, and means controllable from the vehicle whereby the bucket may be caused to turn in said plane.

22. In combination, a draft vehicle, a bottomless scraper bucket of a form adapting the bucket to dig, and also to stop digging, by the same draft force coupled with the reactive force due to resistance of the material into which the bucket is drawn, means connecting said bucket with the vehicle pivotally connected to the bucket on a horizontal axis closely adjacent the ground and the front end of the bucket and permitting said bucket to be turned on the ground in a vertical plane about an axis passing through a ground-engaging portion of the bucket, and means whereby the bucket during forward movement may be caused to turn in said plane.

23. In combination, a draft vehicle, a bottomless scraper bucket having a wall shaped to underlie a portion of its load, means connecting said bucket with said vehicle and permitting said bucket to be turned on its forward portion as a fulcrum in a vertical plane on the ground, dig preventing means carried by said forward portion to act as said fulcrum and means whereby the bucket in loaded condition may be transported in a position in which the weight of the bucket and a portion of the weight of the load is carried on said fulcrum at the front of the bucket in the travelling of the bucket.

24. In combination, a draft vehicle, a bottomless scraper bucket having a wall shaped to underlie a portion of its load having laterally widened arcuate members at its forward end, means connecting said bucket with said vehicle and permitting said bucket to be turned on said members as a fulcrum in a vertical plane on the ground, and means whereby the bucket in loaded condition may be transported in a position in which the weight of the bucket and a portion of the weight of the load is carried as a fulcrum on said members in the travel of the bucket.

25. In combination, a draft vehicle, a scraper bucket, draft means for the bucket permitting said bucket to be turned on the ground in a vertical plane about a horizontal axis passing through a ground-engaging portion of the bucket, and means operative to exert a force against the bucket for forcing it downwardly at its rear portion.

26. The combination of a scraper having a cutting edge extending simultaneously forwardly and laterally of, and in opposite directions from, the median line of the bucket, means to prevent the forward extremities of the cutting edge from entering the ground, and draft means comprising means to vary and control the vertical angular position of said bucket while the draft means in operating for the purpose set forth.

27. The combination of a scraper bucket having a cutting edge extending simultaneously forwardly and laterally of, and in opposite directions from, the median line of the bucket, laterally widened arcuate elements at the forward extremities of the cutting edge to support the bucket on the ground, draft-means pivoted to the bucket at points closely adjacent the cutting edge, and control means operable to turn the bucket upon said elements between filling and dumping positions while said draft-means is operating.

28. In a device of the class described, in combination: a scraper bucket comprising a cutting edge extending continuously from the outer, forward portions of the bucket to a common point at the rear thereof, and ground-engaging dig-preventing elements at said outer forward portions; and draft means comprising means to vary and control the vertical angular position of said cutting edge rearward of said elements while said draft-means is operating.

HARRY A. ROE.